(12) United States Patent
Poulad

(10) Patent No.: US 11,965,539 B2
(45) Date of Patent: Apr. 23, 2024

(54) ANTI-CREEP ANTI-BACK-OUT COMPACT FASTENER

(71) Applicant: MICROSOFT TECHNOLOGY LICENSING, LLC, Redmond, WA (US)

(72) Inventor: Navid Poulad, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 17/383,415

(22) Filed: Jul. 22, 2021

(65) Prior Publication Data
US 2023/0026833 A1 Jan. 26, 2023

(51) Int. Cl.
*F16B 39/284* (2006.01)

(52) U.S. Cl.
CPC .................. *F16B 39/284* (2013.01)

(58) Field of Classification Search
CPC .................................................. F16B 39/284
USPC ................... 411/111, 289, 299, 314, 341
See application file for complete search history.

(56) References Cited

U.S. PATENT DOCUMENTS

| | | | |
|---|---|---|---|
| 860,758 A * | 7/1907 | Morey | F16B 39/128 |
| 3,343,580 A * | 9/1967 | Coldren | F16B 39/24 |
| | | | 411/959 |
| 3,638,386 A * | 2/1972 | Waerner | B66C 1/666 |
| | | | 52/704 |
| 4,350,465 A * | 9/1982 | Lovisek | F16B 39/26 |
| | | | 411/165 |
| 4,741,654 A * | 5/1988 | Lovisek | F16B 39/26 |
| | | | 411/959 |
| 6,267,543 B1 * | 7/2001 | David | F16B 21/02 |
| | | | 411/549 |
| 7,760,491 B2 * | 7/2010 | Choi | H04N 5/64 |
| | | | 361/679.01 |
| 9,004,836 B2 * | 4/2015 | Wells | F16B 23/0007 |
| | | | 81/460 |
| 2014/0348609 A1 * | 11/2014 | Chen | F16B 39/282 |
| | | | 411/209 |
| 2015/0063943 A1 * | 3/2015 | Morris | F16B 19/004 |
| | | | 411/33 |
| 2017/0248801 A1 * | 8/2017 | Ashwood | G02C 5/143 |
| 2018/0149186 A1 * | 5/2018 | Bogrash | F16B 39/225 |
| 2019/0000519 A1 * | 1/2019 | Dmuschewsky | A61B 17/8047 |
| 2020/0116190 A1 * | 4/2020 | Yamashita | F16B 39/122 |
| 2021/0124184 A1 * | 4/2021 | Wang | G02C 5/143 |

FOREIGN PATENT DOCUMENTS

| | | |
|---|---|---|
| CN | 104895893 A | 9/2015 |
| WO | 2009001421 A1 | 12/2008 |

OTHER PUBLICATIONS

"International Search Report and Written Opinion Issued in PCT Application No. PCT/US22/031700", dated Aug. 30, 2022, 9 Pages.

* cited by examiner

*Primary Examiner* — Gary W Estremsky
(74) *Attorney, Agent, or Firm* — Han Gim; Newport IP, LLC

(57) ABSTRACT

An integrated fastener includes a threaded portion, a fastener head, and one or more spring fingers integrated into the fastener head, wherein the spring fingers are configured to apply a compressive load when the fastener is inserted and secured to a receiving assembly.

20 Claims, 10 Drawing Sheets

ANTI-CREEP ANTI-BACK-OUT COMPACT FASTENER

BACKGROUND

Ruggedized products intended for use in a large temperature range and under high shock and vibration environments are typically made from metals or specialty plastics with low-creep characteristics such that fasteners used on the ruggedized products can maintain the required clamping pressure at the desired interfaces. However, metals are generally heavy and low-creep plastics do not possess other desirable characteristics such as high yield strength or low coefficient of thermal expansion (CTE). Low-creep plastics generally also have a low melt flow rate, which requires thicker wall sections are needed for injection molding which leads to heavier parts.

The disclosure made herein is presented with respect to these and other technical challenges.

SUMMARY

The present disclosure enables the use of desirable engineering plastics (for example, 20% carbon filled polycarbonate) by solving two problems in fastener applications with the otherwise desirable plastics: 1) plastic creep, and 2) fastener back-out. Through implementations of the disclosed technologies, fasteners and other parts can be produced for ruggedized products that address the problems noted above. Other technical benefits not specifically mentioned herein can also be realized through implementations of the disclosed subject matter.

In order to realize the technical benefits mentioned briefly above, and potentially others, an anti-creep anti-back-out fastener design is described which integrates a compression spring and optionally an anti-back-out mechanism (e.g., serration) into one compact design. The disclosure provides two possible embodiments that implement the disclosed principles, but it is noted that other variations are possible. The anti-creep anti-back-out design can be modified for different fastener materials, different compression loads, and different back-out requirements.

The described embodiments and various other features will be apparent from a reading of the following Detailed Description and a review of the associated drawings. This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

Figure 1:
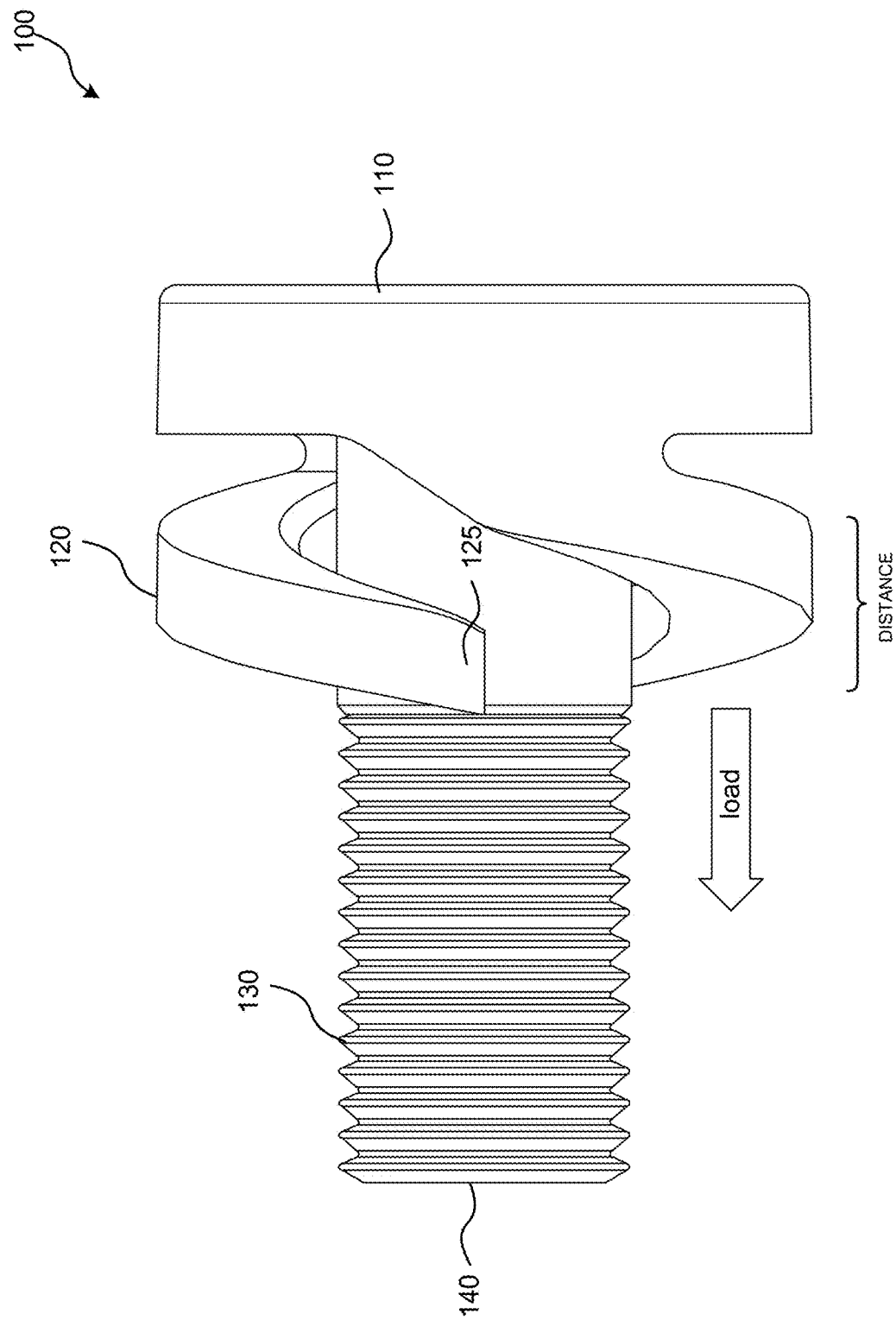
FIG. 1 shows an illustrative configuration of a fastener according to one embodiment disclosed herein.

The following detailed description is directed to an anti-creep anti-back-out fastener design which integrates a compression mechanism and optionally an anti-back-out mechanism into one compact design. Existing solutions typically rely on additional spring washers to implement anti-creep characteristics. However, handling separate washers for small fasteners (e.g., from M0.8-M3 thread diameters, which are frequently used sizes in ruggedized consumer electronic applications) at the factory can be very challenging for assembly. Spring washers can sometimes be made "captive" with the fastener (meaning the fastener and washer come pre-assembled together), but this solution is also extremely challenging for screw sizes smaller than M2. Furthermore, spring washers (whether captive or loose) create a space challenge for the design because the additional tolerances mean more space must be allocated to the screw head diameter to accommodate the spring washer. Finally, some spring washer designs prevent the use of anti-back-out serrations because they shield the screw head from the part under clamping, thus making the design problem more challenging to solve (e.g., the need to create a spring washer with its own anti-back-out serrations). The disclosed embodiments address the issues noted above in a compact design that can be applied to any size fastener.

Ruggedized products may be used in various applications that typically encounter large temperature ranges and/or high vibration or high shock environments. A product that includes thermoplastic components may have resins that relax over temperature changes and shock and drop scenarios. Such relaxation of materials used in fasteners such as screws may cause loss of compressive forces and torque. Such changes may introduce a risk of damage or failure as the loosening of fasteners may cause rattling and loss of alignment. Devices that include sensors and displays such as virtual reality (VR) or augmented reality (AR) devices can be susceptible to certain failures in such cases as the loosening of components from such causes can translate into loss of tolerance between sensors and display components that are critical to the functioning of the product. For example, head tracking sensors typically need to maintain an alignment of the display of 1 to 5 milliradians over the life of the product after calibration, which is difficult to maintain if the fasteners loosen in the manner described.

One solution may be to fasten parts together and maintain the designed compressive load through the life of the product. Some types of products that are designed for harsh environments (e.g., automobiles) are able to employ spring washers. However, when spring washers are implemented, the combination will no longer have radial tolerance between the washer and fastener head. The diameter allowance will need to account for movement between the parts, requiring parts with larger diameters. For example, the inclusion of a washer may require that the washer have a minimum diameter of 1.5 times the head diameter of the corresponding screw. Additionally, the number of parts that are required for a given assembly will increase This can introduce complexity, cost, and quality issues.

The disclosed embodiments allow for the integration of compressive force directly into a fastener in order to avoid the need for an additional part as well as enable the production of a smaller fastener with reduced volume for compact applications. Additionally, the disclosed embodiments enable the addition of useful characteristics to a fastener to avoid the loosening of the fastener and to reduce loss of compression. During continuous vibration and shock/drop events, a screw fastener can twist over time so as to unscrew the fastener. Another issue is loss of compression from temperature and other factors which also effectively loosen the parts being connected by the fastener. To address these issues, some of the disclosed embodiments include features that address compression and anti-backout concerns, as further described herein.

In this detailed description, references are made to the accompanying drawings that form a part hereof, and which are shown by way of illustration specific configurations or examples. Referring now to the drawings, in which like numerals represent like elements throughout the several FIGs., aspects of various techniques for an anti-creep anti-back-out fastener design will be described.

FIG. 1 shows an illustrative configuration of a fastener with an integrated anti-creep anti-back-out feature. FIG. 1 illustrates an integrated fastener assembly 100 having a screw portion 140 with screw threads 130 and a screw head 110. In this example, integrated fastener assembly 100 has two spring fingers 120 integrated into the screw head that generally follow the curvature of the screw portion 140. More generally, the integrated fastener assembly 100 may include a compressive mechanical feature that is built into or integrated with the screw head that applies a compressive load when inserted and secured to a receiving assembly. In some embodiments, the outer diameter of the spring fingers 120 may have the same diameter as screw head 110.

In some embodiments, the integrated fastener assembly 100 may include material that is operable to maintain desired compressive characteristics when the integrated fastener assembly 100 is secured in a receiving assembly.

In some embodiments, the spring fingers 120 of integrated fastener assembly 100 may include serrations or other features that can prevent the integrated fastener assembly 100 from turning loose during shock and vibration events. Referring to FIG. 1, the spring fingers 120 have edges 125 that are directed outward such that the edges 125 will dig into the surrounding material if the integrated fastener assembly 100 rotates in a direction that will loosen the integrated fastener assembly 100. The edge 125 is one example of a mechanism that can resist the rotation of the integrated fastener assembly 100.

The spring fingers 120 may be shaped so as to apply a compressive force as shown when the integrated fastener assembly 100 is rotated and the screw threads 130 cause the integrated fastener assembly 100 to further tighten against the receiving structure. The spring fingers 120 may have a working distance as shown which indicates how far the spring fingers 120 may be compressed as the integrated fastener assembly 100 is rotated and tightened. This compressive distance may be reduced if more spring fingers are included in the design which may allow for a lesser longitudinal compressive distance. Additionally, the addition of additional teeth or serrations for anti-rotation of the integrated fastener assembly 100 may also allow for a lesser longitudinal compressive distance. Embodiments of the present disclosure may consider a balance between the prevention of loosening and prevention of relaxation of compression.

The integrated fastener assembly 100 may comprise any suitable material that has a high strain to failure or other measure of how much the integrated fastener assembly 100 may be compressed or elongated to failure. For example, the integrated fastener assembly 100 may be made of spring steel or stainless steel. In some embodiments, the strain to failure may be in the range of 0.2% to 4%.

Figure 2A:
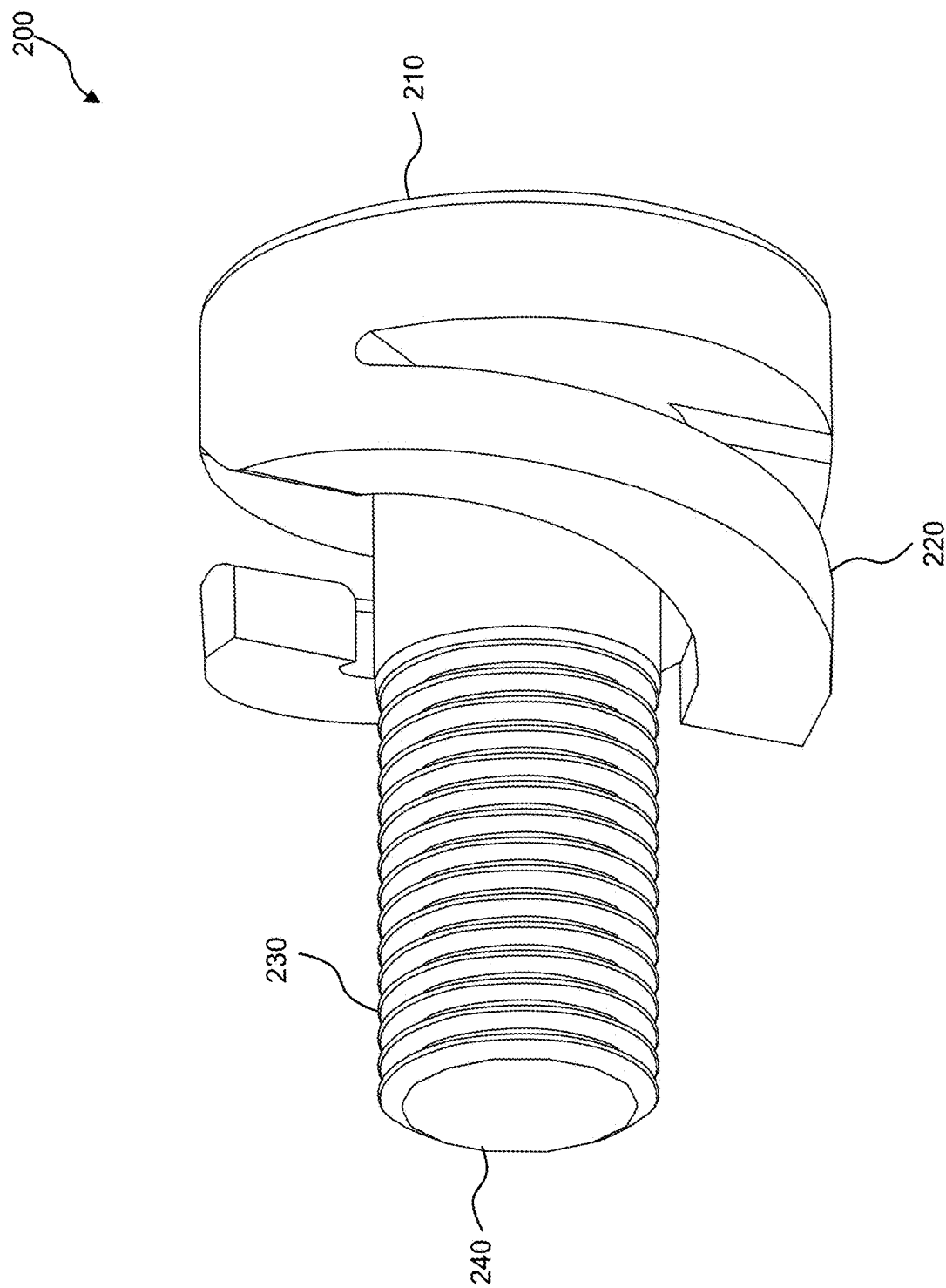
FIG. 2A shows an illustrative configuration of a fastener according to one embodiment disclosed herein.

FIG. 2A shows another illustrative configuration of a fastener with an integrated anti-creep anti-back-out feature. FIG. 2A illustrates an integrated fastener assembly 200 having a screw portion 240 with screw threads 230 and a screw head 210. In this example, integrated fastener assembly 200 has two spring fingers 220 integrated into the screw head that generally follow the curvature of the screw portion 240. FIG. 2 illustrates that the outer diameter of the spring fingers 220 may have the same diameter as screw head 210.

In some embodiments, the integrated fastener assembly 200 may include material that is operable to maintain desired compressive characteristics when the integrated fastener assembly 200 is secured in a receiving assembly.

The spring fingers 220 may be shaped so as to apply a compressive force as shown when the integrated fastener assembly 200 is rotated and the screw threads 230 cause the integrated fastener assembly 200 to further tighten against the receiving structure.

Figure 2B:
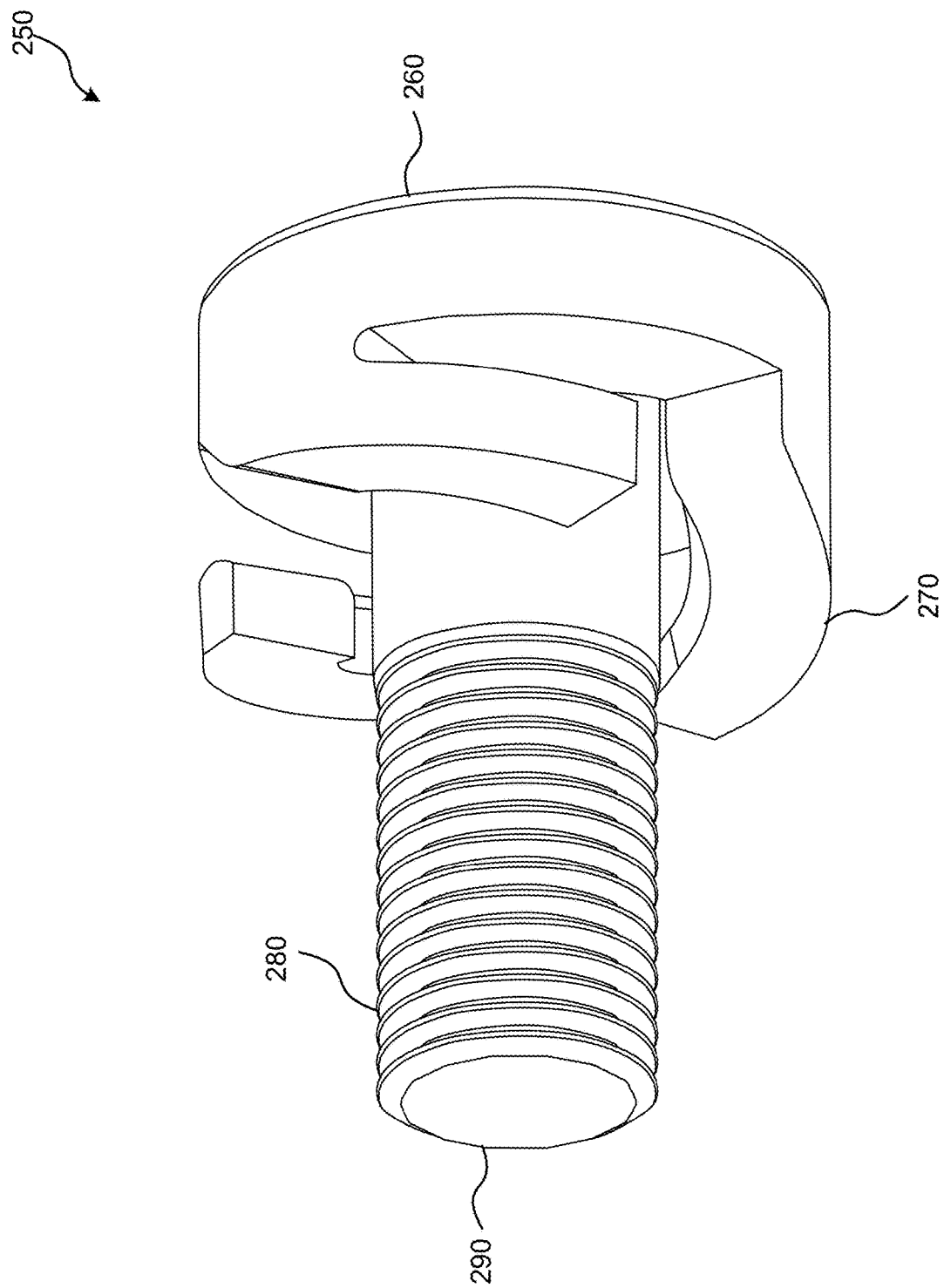
FIG. 2B shows an illustrative configuration of a fastener according to one embodiment disclosed herein.

FIG. 2B shows another illustrative configuration of a fastener with an integrated anti-creep anti-back-out feature with three spring fingers. The number of spring fingers may be vary depending on the balance of anti-creep anti-back-out features that are desired for a particular application. FIG. 2B illustrates an integrated fastener assembly 250 having a screw portion 290 with screw threads 280 and a screw head 260. In this example, integrated fastener assembly 250 has three spring fingers 270 integrated into the screw head that generally follow the curvature of the screw portion 290. FIG. 2B illustrates that the outer diameter of the spring fingers 270 may have the same diameter as screw head 260.

In some embodiments, the integrated fastener assembly 250 may include material that is operable to maintain desired compressive characteristics when the integrated fastener assembly 250 is secured in a receiving assembly.

The spring fingers 270 may be shaped so as to apply a compressive force as shown when the integrated fastener assembly 250 is rotated and the screw threads 280 cause the integrated fastener assembly 250 to further tighten against the receiving structure.

Figure 3A:
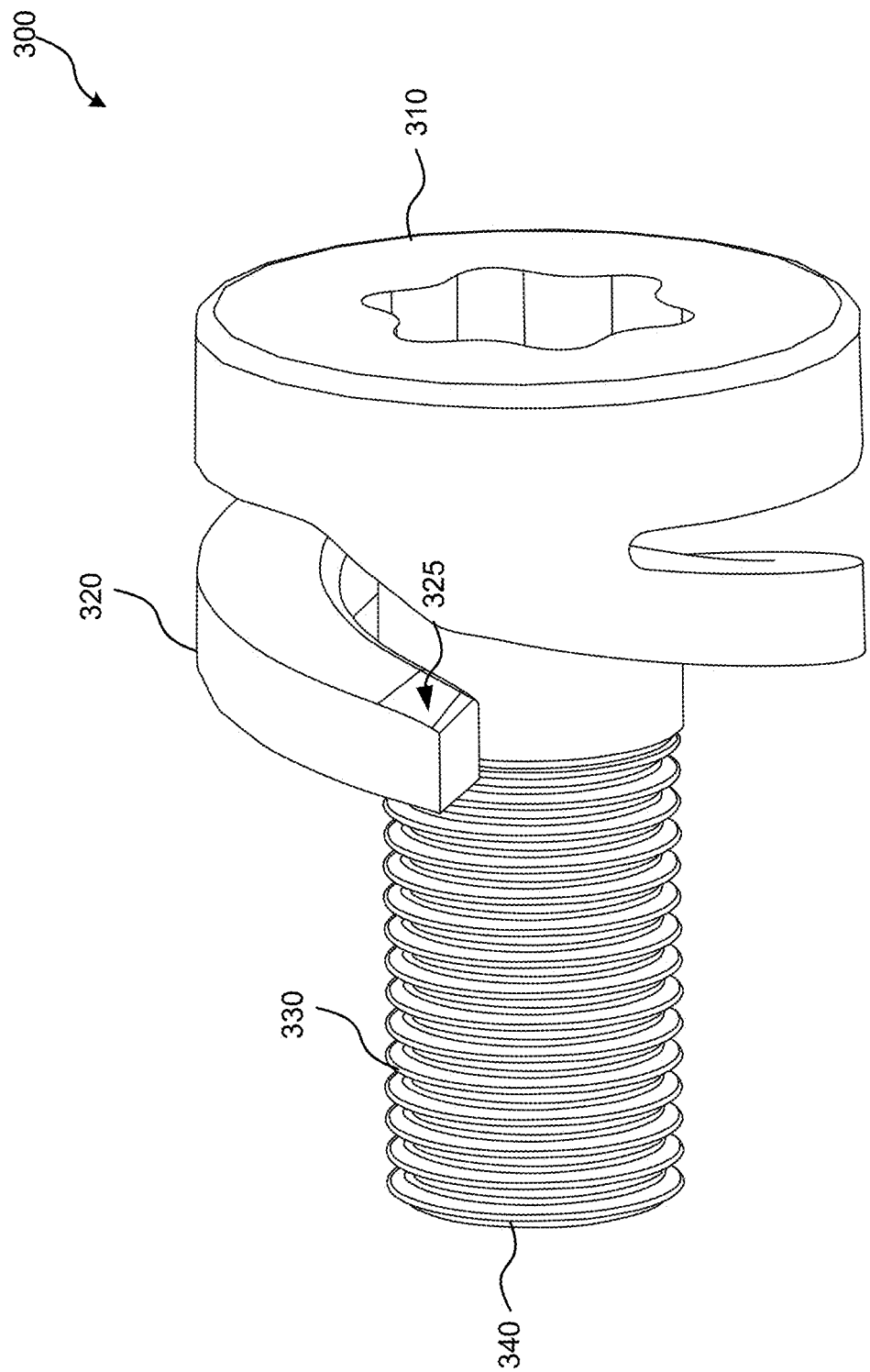
FIG. 3A shows an illustrative configuration of a fastener according to one embodiment disclosed herein.

FIG. 3A shows another illustrative configuration of a fastener with an integrated anti-creep anti-back-out feature. FIG. 3A illustrates an integrated fastener assembly 300 having a screw portion 340 with screw threads 330 and a screw head 310. In this example, integrated fastener assembly 300 has two spring fingers 320 integrated into the screw head that generally follow the curvature of the screw portion 340. FIG. 3A illustrates that the outer diameter of the spring fingers 320 may have the same diameter as screw head 310.

The spring fingers 320 may be shaped so as to apply a compressive force as shown when the integrated fastener assembly 300 is rotated and the screw threads 330 cause the integrated fastener assembly 300 to further tighten against the receiving structure. The spring fingers 320 may further have edges 325 that are directed outward such that the edges 325 will resistively contact the surrounding material if the integrated fastener assembly 300 rotates in a direction that will loosen the integrated fastener assembly 300.

Figure 3B:
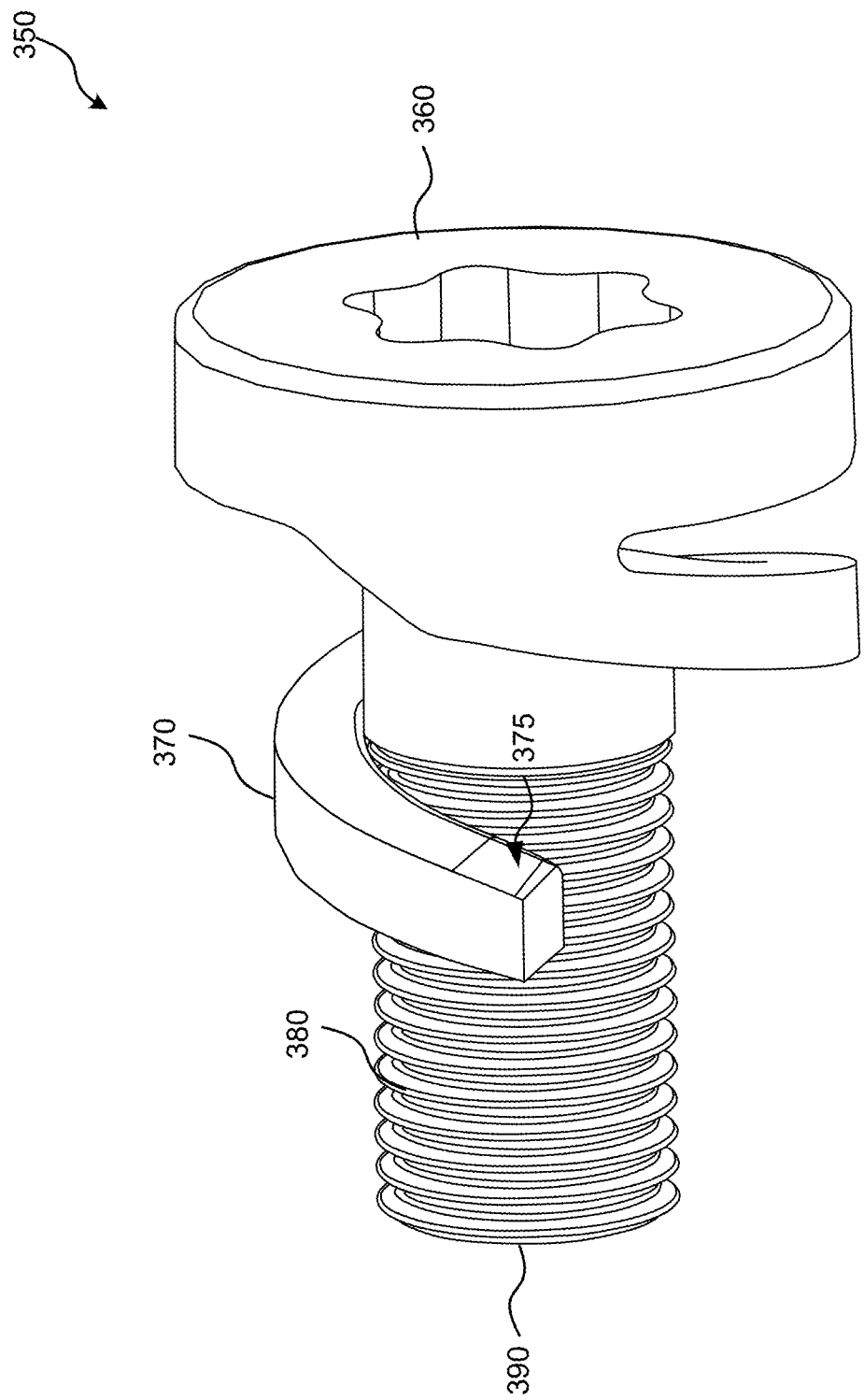
FIG. 3B shows an illustrative configuration of a fastener according to one embodiment disclosed herein.

FIG. 3B shows another illustrative configuration of a fastener with an integrated anti-creep anti-back-out feature having a single helical spring finger. FIG. 3B illustrates an integrated fastener assembly 350 having a screw portion 390 with screw threads 380 and a screw head 360. In this example, integrated fastener assembly 350 has a single spring finger 370 integrated into the screw head that generally follow the curvature of the screw portion 390.

The spring finger 370 may be shaped so as to apply a compressive force as shown when the integrated fastener assembly 350 is rotated and the screw threads 330 cause the integrated fastener assembly 300 to further tighten against the receiving structure. The spring finger 370 may further have an edge 325 that is directed outward such that the edge 325 will resistively contact the surrounding material if the integrated fastener assembly 350 rotates in a direction that will loosen the integrated fastener assembly 350.

Figure 4:
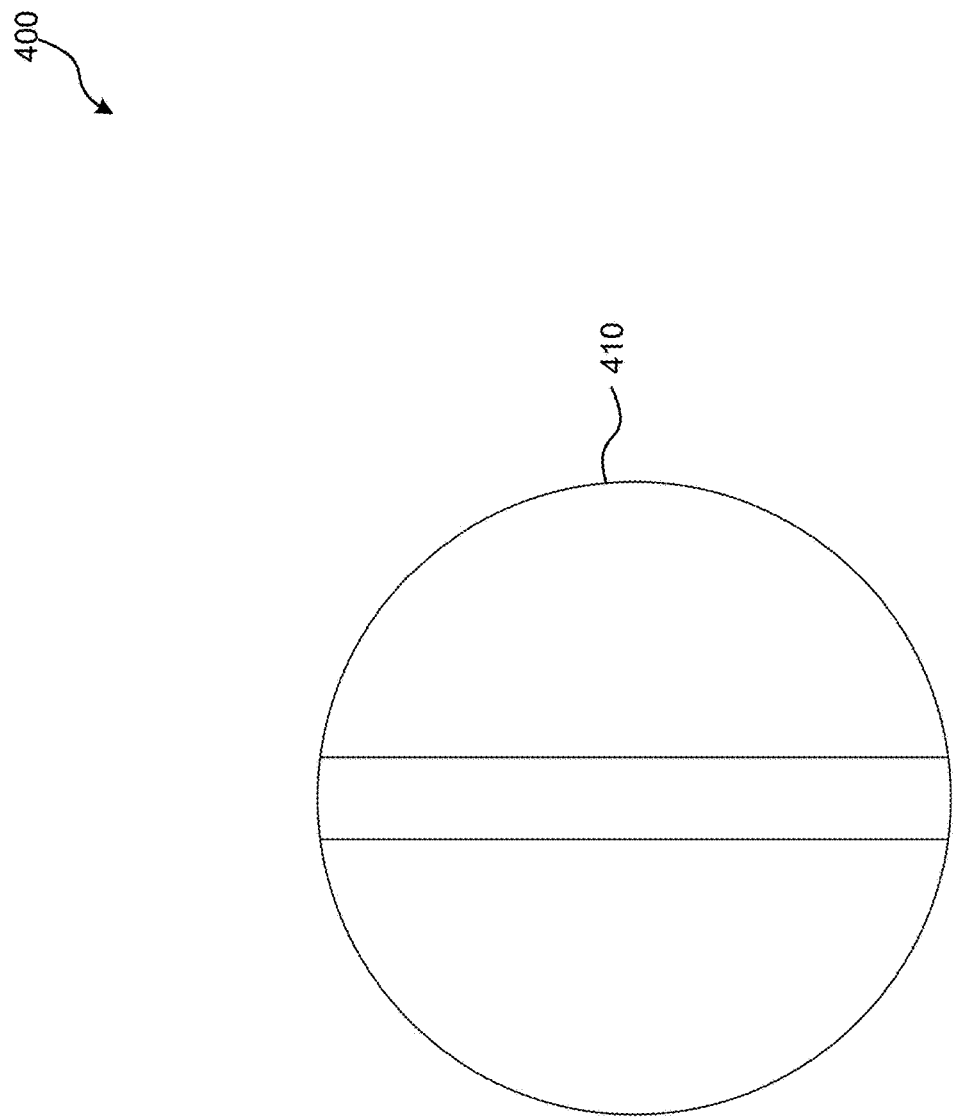
FIG. 4 shows an illustrative configuration of a fastener according to one embodiment disclosed herein.
Figure 5:
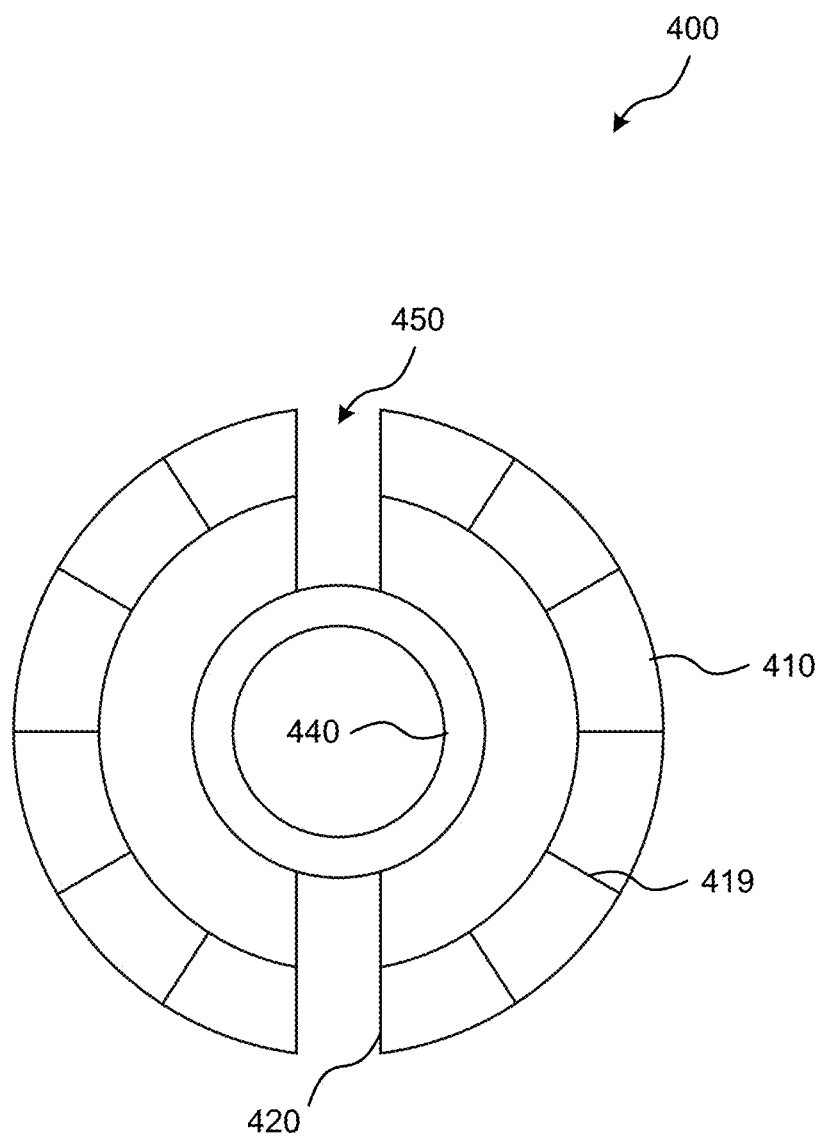
FIG. 5 shows an illustrative configuration of a fastener according to one embodiment disclosed herein.
Figure 6:
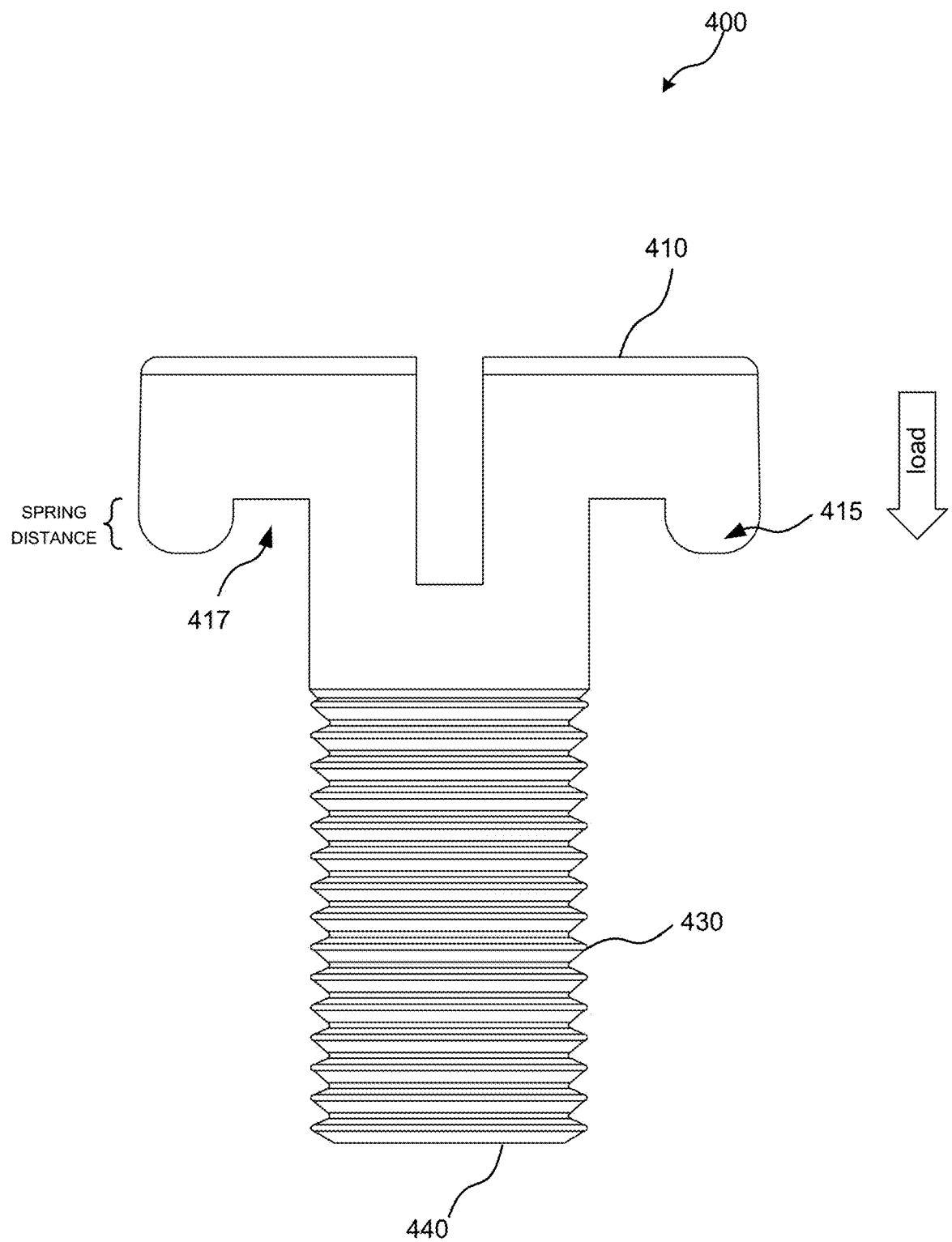
FIG. 6 shows an illustrative configuration of a fastener according to one embodiment disclosed herein.

FIGS. 4-6 illustrate different views of another embodiment of a fastener with an integrated anti-creep anti-back-out feature. FIG. 4 illustrates a top view of an integrated fastener assembly 400 having a screw head 410 with a gap 450. It should be understood that the screw head may be of various types and can have different variations such as slotted (as shown in FIG. 4), Phillips, Torx, Hex, Square, Tamper proof, and other variations as known to one skilled in the art. FIG. 5 illustrates a bottom view of the integrated fastener assembly 400 having a screw portion 440. In this example, integrated fastener assembly 400 has two spring arms 420 integrated into the screw head that generally follow the curvature of the screw head 410, which is further illustrated in the side cross-sectional view shown in FIG. 6. The two spring arms 420 of integrated fastener assembly 400 provide a compressive mechanical feature that applies a compressive load when inserted and secured to a receiving assembly. In some embodiments, FIG. 5 illustrates serrations 419 on the outer diameter of the two spring arms 420. The serrations 419 of integrated fastener assembly 400 can prevent the integrated fastener assembly 400 from turning loose during shock and vibration events.

In some embodiments, the integrated fastener assembly 400 may include material that is operable to maintain desired compressive characteristics when the integrated fastener assembly 400 is secured in a receiving assembly.

Referring to FIG. 6, the spring arms 420 may extend a distance as illustrated and may form a gap 417 within the screw head. The spring arms 420 may provide a compressive force into the surrounding material as the integrated fastener assembly 400 is secured and further tightened into the receiving area. Additionally, optional serrations 419 may resist rotational movement that will loosen the integrated fastener assembly 400 during vibration, shock, and other events.

The spring arms 420 may be shaped so as to apply a compressive force as shown when the integrated fastener assembly 400 and the screw threads 430 cause the integrated fastener assembly 400 to tighten against the receiving structure as the spring arms 420 will flex to close the gap 417, applying a continuous compressive load onto the component that is being secured. The spring arms 420 may have a working distance as shown which indicates how far the spring fingers 420 may be compressed as the integrated fastener assembly 400 is rotated and tightened.

Figure 7:
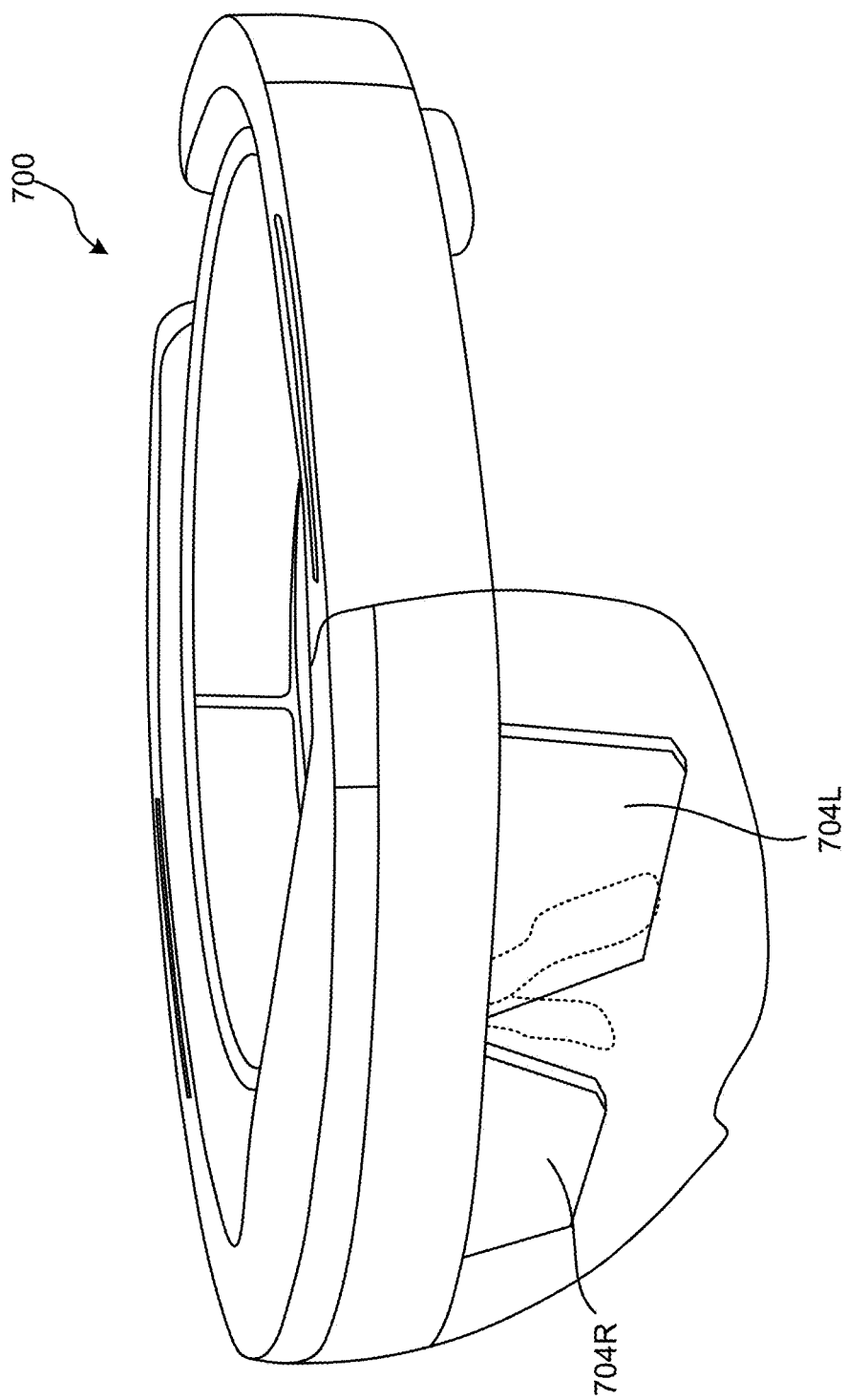
FIG. 7 shows an example ruggedized environment in which aspects of the technologies disclosed herein can be implemented.

FIG. 7 shows aspects of the configuration of an illustrative display device 700 where a fastener with an integrated anti-creep anti-back-out feature as disclosed herein may be implemented. In some examples, the display device 700 may generate a composite view that includes both one or more computer-generated ("CG") images and a view of at least a portion of the real-world environment surrounding the display device 700. For example, the display device 700 may utilize various technologies such as, for example, augmented reality ("AR") technologies to generate composite views that include CG images superimposed over a real-world view. In the illustrated example, the display panel 704 includes separate right eye and left eye transparent display panels, labeled 704R and 704L, respectively. In some examples, the display panel 704 may include a single transparent display panel that is viewable with both eyes and/or a single transparent display panel that is viewable by a single eye only.

It can be appreciated that the techniques described herein may be deployed within a single-eye display device 700 (e.g. GOOGLE GLASS) and/or a dual-eye display device 700 (e.g. MICROSOFT HOLOLENS). The display device 700 shown in FIG. 7 is an example device that is used to provide context for a fastener with an integrated anti-creep anti-back-out feature as disclosed herein. Other devices and systems may also use the fastener with an integrated anti-creep anti-back-out feature disclosed herein.

Figure 8:
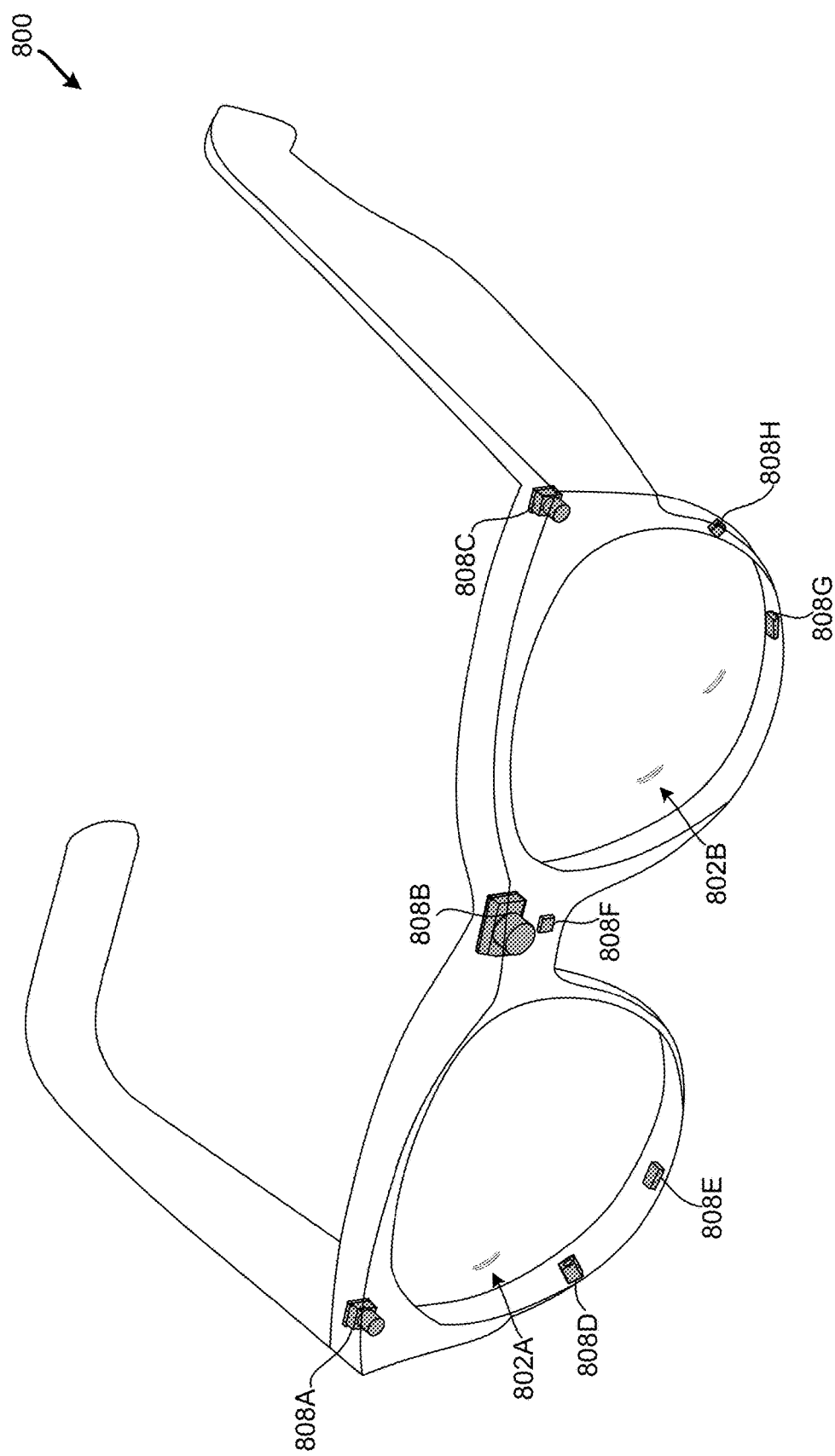
FIG. 8 shows an example ruggedized environment in which aspects of the technologies disclosed herein can be implemented.

FIG. 8 shows aspects of the configuration of an illustrative display device 800 where a fastener with an integrated anti-creep anti-back-out feature as disclosed herein may be implemented. In some configurations, the device 800 can be in the form of a near-to-eye display device that can include a number of sensors 808 used for tracking the movement of the device relative to a surrounding environment. The device can include semi-transparent lenses 802, e.g., a right lens 802A and a left lens 802B, that can enable a user to concurrently view real-world objects in a surrounding environment with rendered objects. The device can coordinate the movement of the sensors to provide an augmented reality experience, where positions of some rendered objects are controlled so they are superimposed over real-world objects. Sensors that are used to track the movement of the device can control the position of rendered objects such that the rendered objects can maintain a position with respect to specific real-world objects when the device rotates or moves within the surrounding environment.

The device can utilize multiple sensors across multiple modalities. For illustrative purposes, a sensing modality can include a particular sensing technique. Examples of sensing techniques can involve, for example, a stereo depth measurement in combination with time-of-flight depth measurement. In another example, which is described in more detail below, an individual sensing technique can involve the use of multiple IMUs, or the use of IMUs with a stereo depth measurement, etc. In one illustrative example, the device can include a set of sensors utilizing a first sensing modality, e.g., the first sensor 808A and the third sensor 808C configured to perform a first depth measurement based on a stereo measurement. The device can also include other sensors utilizing a second sensing modality, e.g., a second sensor 808B configured to perform a second depth measurement based on a time-of-flight measurement. This example is provided for illustrative purposes and is not to be construed as limiting. Can be appreciated that the device 800 can comprise any suitable number of sensors, e.g., sensors 808A-808H, and utilize any combination of sensing modalities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The disclosure presented herein also encompasses the subject matter set forth in the following clauses:

Clause 1. An integrated fastener comprising:
a threaded portion,
a fastener head, and
one or more spring fingers integrated into the fastener head, wherein the spring fingers are configured to apply a compressive load when the threaded portion is inserted and secured to a receiving assembly.

Clause 2. The integrated fastener of clause 1, wherein the spring fingers are configured to resist back-out of the integrated fastener.

Clause 3. The integrated fastener of any of clauses 1 or 2, wherein the spring fingers are configured with one or more serrations.

Clause 4. The integrated fastener of any of clauses 1-3, wherein the integrated fastener comprises a material with a threshold strain to failure.

Clause 5. The integrated fastener of any of clauses 1-4, wherein the integrated fastener comprises spring steel or stainless steel.

Clause 6. The integrated fastener of any of clauses 1-5, wherein an outer diameter of the spring fingers has a same diameter as a head of the integrated fastener.

Clause 7. The integrated fastener of any of clauses 1-6, wherein the spring fingers are configured to flex as the integrated fastener is tightened against a receiving component.

Clause 8. The integrated fastener of any of clauses 1-7, wherein the spring fingers are attached to the fastener head.

Clause 9. A display device comprising:
one or more components that are affixed to a frame of the display device using an integrated fastener comprising:
a threaded portion,
a fastener head, and
one or more spring fingers integrated into the fastener head, wherein the spring fingers are configured to apply a compressive load when the integrated fastener is inserted and secured to a receiving assembly.

Clause 10. The display device of clause 9, wherein the spring fingers are configured to resist back-out of the integrated fastener.

Clause 11. The display device of any of clauses 9 or 10, wherein the spring fingers are configured with one or more serrations.

Clause 12. The display device of any of clauses 9-11, wherein the integrated fastener comprises a material with a threshold strain to failure.

Clause 13. The display device of any of clauses 9-12, wherein the integrated fastener comprises spring steel or stainless steel.

Clause 14. The display device of any of clauses 9-13, wherein an outer diameter of the spring fingers has a same diameter as a head of the integrated fastener.

Clause 15. The display device of any of clauses 9-14, wherein the spring fingers are configured to flex as the integrated fastener is tightened against a receiving component.

Clause 16. The display device of any of clauses 9-15, wherein the spring fingers are attached to the fastener head.

Clause 17. A method for component assembly comprising:
aligning a first subcomponent to a second subcomponent using an integrated fastener comprising a threaded portion, a fastener head, and one or more spring fingers integrated into the fastener head, wherein the spring fingers are configured to apply a compressive load when inserted and secured to a receiving assembly; and
engaging the integrated fastener to a structure on the second subcomponent to securing the first subcomponent relative to the second subcomponent and engaging the thread portion of the fastener head such that the spring fingers apply the compressive load.

Clause 18. The method of clause 17, wherein the spring fingers are configured to resist back-out of the integrated fastener.

Clause 19. The method of any of clauses 17-18, wherein the spring fingers are configured with one or more serrations.

Clause 20. The method of any of clauses 17-19, wherein the spring fingers are configured to flex as the integrated fastener is tightened against a receiving component.

The invention claimed is:

1. An integrated fastener comprising:
a threaded portion,
a fastener head, and
one or more spring fingers integrated into the fastener head, wherein the one or more spring fingers extend away from a periphery of the fastener head in a helical direction and continuing around the thread portion around 180 degrees, and wherein the one or more spring fingers are configured to apply a compressive load when the threaded portion is inserted and secured to a receiving assembly.

2. The integrated fastener of claim 1, wherein the one or more spring fingers are configured to resist back-out of the integrated fastener.

3. The integrated fastener of claim 2, wherein the one or more spring fingers are configured with one or more serrations.

4. The integrated fastener of claim 1, wherein the integrated fastener comprises a material with a threshold strain to failure.

5. The integrated fastener of claim 1, wherein the integrated fastener comprises spring steel or stainless steel.

6. The integrated fastener of claim 1, wherein an outer diameter of the one or more spring fingers has a same diameter as a head of the integrated fastener.

7. The integrated fastener of claim 1, wherein the one or more spring fingers are configured to flex as the integrated fastener is tightened against a receiving component.

8. The integrated fastener of claim 1, wherein the one or more spring fingers are attached to the fastener head.

9. A display device comprising:
one or more components that are affixed to a frame of the display device using an integrated fastener comprising:
a threaded portion,
a fastener head, and
one or more spring fingers integrated into the fastener head, wherein the spring fingers extend away from a periphery of the fastener head in a helical direction and continuing around the thread portion around 180 degrees, and wherein the one or more spring fingers are configured to apply a compressive load when the integrated fastener is inserted and secured to a receiving assembly.

10. The display device of claim 9, wherein the one or more spring fingers are configured to resist back-out of the integrated fastener.

11. The display device of claim 10, wherein the one or more spring fingers are configured with one or more serrations.

12. The display device of claim 9, wherein the integrated fastener comprises a material with a threshold strain to failure.

13. The display device of claim 9, wherein the integrated fastener comprises spring steel or stainless steel.

14. The display device of claim 9, wherein an outer diameter of the one or more spring fingers has a same diameter as a head of the integrated fastener.

15. The display device of claim 9, wherein the one or more spring fingers are configured to flex as the integrated fastener is tightened against a receiving component.

16. The display device of claim 9, wherein the one or more spring fingers are attached to the fastener head.

17. A method for component assembly comprising:
aligning a first subcomponent to a second subcomponent using an integrated fastener comprising a threaded portion, a fastener head, and one or more spring fingers integrated into the fastener head, wherein the one or more spring fingers extend away from a periphery of the fastener head in a helical direction and continuing around the thread portion around 180 degrees, and wherein the one or more spring fingers are configured to apply a compressive load when inserted and secured to a receiving assembly; and
engaging the integrated fastener to a structure on the second subcomponent to securing the first subcomponent relative to the second subcomponent and engaging the thread portion of the fastener head such that the one or more spring fingers apply the compressive load.

18. The method of claim 17, wherein the one or more spring fingers are configured to resist back-out of the integrated fastener.

19. The method of claim 18, wherein the one or more spring fingers are configured with one or more serrations.

20. The method of claim 18, wherein the one or more spring fingers are configured to flex as the integrated fastener is tightened against a receiving component.

* * * * *